United States Patent
Lin et al.

(10) Patent No.: US 11,225,216 B1
(45) Date of Patent: Jan. 18, 2022

(54) BLANKET AIRBAG WITH INTEGRATED SEAT BELT SYSTEM

(71) Applicant: GM GLOBAL TECHNOLOGY OPERATIONS LLC, Detroit, MI (US)

(72) Inventors: Chin-Hsu Lin, Troy, MI (US); Yi-pen Cheng, Troy, MI (US); Scott D. Thomas, Novi, MI (US); Gary L. Jones, Farmington Hills, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/152,121

(22) Filed: Jan. 19, 2021

(51) Int. Cl.
*B60R 21/207* (2006.01)
*B60R 21/2334* (2011.01)

(52) U.S. Cl.
CPC ........ *B60R 21/207* (2013.01); *B60R 21/2334* (2013.01)

(58) Field of Classification Search
CPC .............................................. B60R 2021/2074
See application file for complete search history.

(56) References Cited

U.S. PATENT DOCUMENTS

| | | |
|---|---|---|
| 6,331,014 B1 | 12/2001 | Breed |
| 6,662,092 B2 | 12/2003 | Wang et al. |
| 6,726,260 B1 | 4/2004 | Wang et al. |
| 6,816,766 B2 | 11/2004 | Sala et al. |
| 7,232,178 B2 | 6/2007 | Neal et al. |
| 7,334,656 B2 | 2/2008 | Kramarczyk et al. |
| 7,369,928 B2 | 5/2008 | Wang et al. |
| 7,401,846 B2 | 7/2008 | Browne et al. |
| 7,997,620 B1 | 8/2011 | Dong et al. |
| 8,135,506 B2 | 3/2012 | Hansen et al. |

(Continued)

FOREIGN PATENT DOCUMENTS

| | | | | |
|---|---|---|---|---|
| DE | 102019201308 A1 | * | 8/2020 | ............... B60N 2/34 |
| DE | 102020204852 A1 | * | 11/2020 | ........... B60R 21/231 |

(Continued)

OTHER PUBLICATIONS

U.S. Appl. No. 16/421,799, filed May 24, 2019, Lin et al.

*Primary Examiner* — Faye M Fleming (57) ABSTRACT

A vehicle seat safety system. The vehicle safety seat system comprises a vehicle seat configured to move between a substantially reclining position and a substantially sitting position. The vehicle seat comprises at least a seat back and a seat bottom. The system also includes an enclosure configured to store a blanket airbag in an undeployed position prior to a collision, wherein the enclosure is disposed near the head of a passenger in the vehicle seat, and wherein the blanket airbag is ejected from the enclosure to an intermediate position in the event of a collision. The system further comprises a first electromechanical restraint system associated with the seat back and coupled to the blanket airbag by a first physical coupling and a second electromechanical restraint system associated with the seat bottom and coupled to the blanket airbag by a second physical coupling. The first and second electromechanical restraint systems pull the blanket airbag from the intermediate position to a deployed position in which the blanket airbag substantially covers the passenger.

20 Claims, 7 Drawing Sheets

(56) References Cited

U.S. PATENT DOCUMENTS

| | | | |
|---|---|---|---|
| 8,226,119 B2 | 7/2012 | Dong et al. | |
| 8,335,616 B2 | 12/2012 | Neal et al. | |
| 8,339,268 B2 | 12/2012 | Deng et al. | |
| 8,606,465 B2 | 12/2013 | Wang et al. | |
| 8,657,340 B2* | 2/2014 | Friedman | B60R 21/16 |
| | | | 280/806 |
| 8,727,377 B2 | 5/2014 | Wang | |
| 8,967,665 B1 | 3/2015 | Lin et al. | |
| 9,150,238 B2 | 10/2015 | Alcazar et al. | |
| 10,214,132 B2 | 2/2019 | Wang et al. | |
| 10,252,694 B2 | 4/2019 | Lin et al. | |
| 11,040,689 B2* | 6/2021 | Lin | B60R 21/231 |
| 2004/0021670 A1 | 2/2004 | Emmot et al. | |
| 2004/0051632 A1 | 3/2004 | Sala et al. | |
| 2004/0102883 A1 | 5/2004 | Sala et al. | |
| 2004/0133325 A1 | 7/2004 | Neal et al. | |
| 2009/0200774 A1 | 8/2009 | Nam et al. | |
| 2010/0121536 A1 | 5/2010 | Wang et al. | |
| 2012/0053793 A1 | 3/2012 | Sala et al. | |
| 2012/0053794 A1 | 3/2012 | Alcazar et al. | |
| 2016/0059813 A1 | 3/2016 | Neal et al. | |
| 2020/0031308 A1* | 1/2020 | Svanberg | B60R 22/201 |

FOREIGN PATENT DOCUMENTS

| | | | | |
|---|---|---|---|---|
| DE | 102019118840 A1 * | 1/2021 | | B60R 21/04 |
| JP | 113147653 A * | 7/2021 | | B60R 22/14 |

* cited by examiner

BLANKET AIRBAG WITH INTEGRATED SEAT BELT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Conventional vehicles use both manual and passive restraint systems to ensure passenger safety in case of an accident. A passive restraint system works automatically and requires no action on the part of the automobile passenger. A well-known example of a passive restraint system is the airbag, which deploys automatically during an accident. The seat belt is perhaps the best-known manual restraint system. The seat belt requires the passenger to buckle the belt in order to ensure his or her own safety.

However, the development of autonomous vehicles has introduced unconventional types of seats in passenger compartments. Many of these new seats enable a passenger to recline almost to a horizontal position. This creates challenges to the effectiveness of conventional manual and passive restraint systems.

SUMMARY

Further areas of applicability of the present disclosure will become apparent from the detailed description, the claims and the drawings. The detailed description and specific examples are intended for purposes of illustration only and are not intended to limit the scope of the disclosure.

It is an aspect of the present disclosure to provide a vehicle seat safety system. The vehicle safety seat system comprises i) a vehicle seat configured to move between a substantially reclining position and a substantially sitting position, the vehicle seat comprising at least a seat back and a seat bottom; and ii) an enclosure configured to store a blanket airbag in an undeployed position prior to a collision. The enclosure is disposed near the head of a passenger in the vehicle seat. The system further comprises iii) a first electromechanical restraint system associated with the seat back and coupled to the blanket airbag by a first physical coupling; and iv) a second electromechanical restraint system associated with the seat bottom and coupled to the blanket airbag by a second physical coupling. The first and second electromechanical restraint systems pull the blanket airbag from the undeployed position to a deployed position in which the blanket airbag substantially covers the portions of a passenger disposed on the seat back and the seat bottom.

In one embodiment, the first and second physical couplings comprise at least one of a belt, a cord, a cable, a cord, or a chain.

In another embodiment, the blanket airbag comprises a plurality of inflatable chambers, wherein the plurality of inflatable chambers are coupled to each other by a first plurality of conduits.

In still another embodiment, the blanket airbag further comprises a tubular airbag disposed around the periphery of the blanket airbag, wherein the tubular airbag is coupled to the first plurality of inflatable chambers of the blanket airbag by a second plurality of conduits.

In yet another embodiment, the tubular airbag comprises a second plurality of inflatable chambers.

In a further embodiment, the first and second plurality of inflatable chambers are coupled by the second plurality of conduits.

In a still further embodiment, the vehicle seat safety system further comprises a source of high-pressure gas coupled to the blanket airbag.

In a yet further embodiment, the source of high-pressure gas inflates the blanket airbag as the first and second electromechanical restraint systems pull the blanket airbag from the intermediate position to the deployed position.

In an embodiment, the blanket airbag further comprises a tubular airbag disposed around the periphery of the blanket airbag, wherein the tubular airbag is coupled to the first plurality of inflatable chambers and the source of high-pressure gas inflates the tubular airbag as the first and second electromechanical restraint systems pull the blanket airbag from the intermediate position to the deployed position.

In another embodiment, the source of high-pressure gas sequentially inflates the first plurality of inflatable chambers of the blanket airbag as the first and second electromechanical restraint systems pull the blanket airbag from the intermediate position to the deployed position.

In still another embodiment, the first electromechanical restraint system is disposed in a housing on an edge of the seat back and the second electromechanical restraint system is disposed in a housing on an edge of the seat bottom.

In yet another embodiment, the first electromechanical restraint system is disposed on a bottom surface of the seat back and the second electromechanical restraint system is disposed on a bottom surface of the seat bottom.

In a further embodiment, the vehicle seat further comprises a leg support.

In a still further embodiment, the vehicle seat safety system further comprises a third electromechanical restraint system associated with the leg support and coupled to the blanket airbag by a third physical coupling.

In a yet further embodiment, the first, second, and third electromechanical restraint systems pull the blanket airbag from the undeployed position to a deployed position in which the blanket airbag substantially covers the portions of a passenger disposed on the seat back, the seat bottom, and the leg support.

In one embodiment, the vehicle safety system further comprises an electromechanical system that ejects the blanket airbag from its initial position to an intermediate position in response to a deployment signal.

In another embodiment, the vehicle safety system further comprises a rail on which a seatbelt is guided from an undeployed location to a deployed location.

In still another embodiment, the vehicle safety system further comprises a seam through which the seatbelt passes as the seatbelt moves from the undeployed location to the deployed location.

It is another object of the present disclosure to provide a method of operating vehicle seat safety system associated with a vehicle seat configured to move between a substantially reclining position and a substantially sitting position. The vehicle seat comprises at least a seat back and a seat bottom. The method comprises: i) storing in an enclosure a blanket airbag in an undeployed position prior to a collision, wherein the enclosure is disposed near the head of a passenger in the vehicle seat; ii) in response to a collision, ejecting the blanket airbag from the enclosure to an intermediate position; iii) pulling the blanket airbag from the intermediate position to a deployed position using a first electromechanical restraint system so that the blanket airbag substantially covers the portions of a passenger disposed on the seat back; and iv) pulling the blanket airbag from the intermediate position to the deployed position using a second electromechanical restraint system so that the blanket airbag substantially covers the portions of a passenger disposed on the seat bottom.

Further areas of applicability of the present disclosure will become apparent from the detailed description, the claims and the drawings. The detailed description and specific examples are intended for purposes of illustration only and are not intended to limit the scope of the disclosure,

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The disclosed system includes a deployable blanket airbag that encloses and protects a passenger from impacts from any direction. The system integrates an energy absorbing (EA) seat belt system into blanket airbags to manage the forces acting on the passenger and optimize effectiveness of the system. The disclosed system uses retracting seat belts to achieve the targeted blanket airbag anchoring locations to cover the passenger in a timely manner. Further, the use of a lower leg seatbelt anchoring at the footrest or a lower leg blanket airbag prevents the passenger from sliding off the seat in a reclined position during a fore crash event or an aft crash event. The disclosed system also provides side tubing chambers to cushion the passenger from side impact events.

In an exemplary embodiment, the blanket airbag deploys starting from the headrest and then covers the occupant down to the lower legs to protect the occupant in a vehicle crash from various impact directions. The system integrates multiple seat belts with built-in belt retracting features into the blanket airbag to ensure rapid and in-position deployment. The energy absorbing (EA) system may be built-in to better control the passenger kinematics. This complete airbag-seatbelt safety system can restrain a passenger when the seat is in its fully reclined position, in its upright position, or in any other reclined position.

The disclosed blanket airbag is designed to cover the entire occupant body in different positions, including in a highly reclined sleeping position and in a normal upright seating position. Seatbelt retracting mechanisms quickly deploy the blanket airbag to designated locations. The use of flexible configurations of airbag chambers and proper placement of energy absorbing (EA) seat belts enable the tuning of restraint to achieve optimal restraint.

In some embodiments, the disclosed blanket airbag may be implemented as two separate smaller blanket airbags. One blanket airbag deploys downward from the upper end of the seat and covers the head and upper torso. The other blanket airbag deploys upward from the lower end of the seat and restrains the lower legs and feet, thereby preventing the passenger from sliding downward. The need for a footrest may be eliminated with the lower leg blanket airbag.

In other embodiments, one or more elongated tube-shaped air chambers implemented along the sides of the blanket airbag provide additional cushion for the passenger from side impacts. The inflated tube chambers are located between the seatbelt straps and the occupant so that inflation of the tube chambers helps tension the seatbelts and removes any slack.

Figure 1:
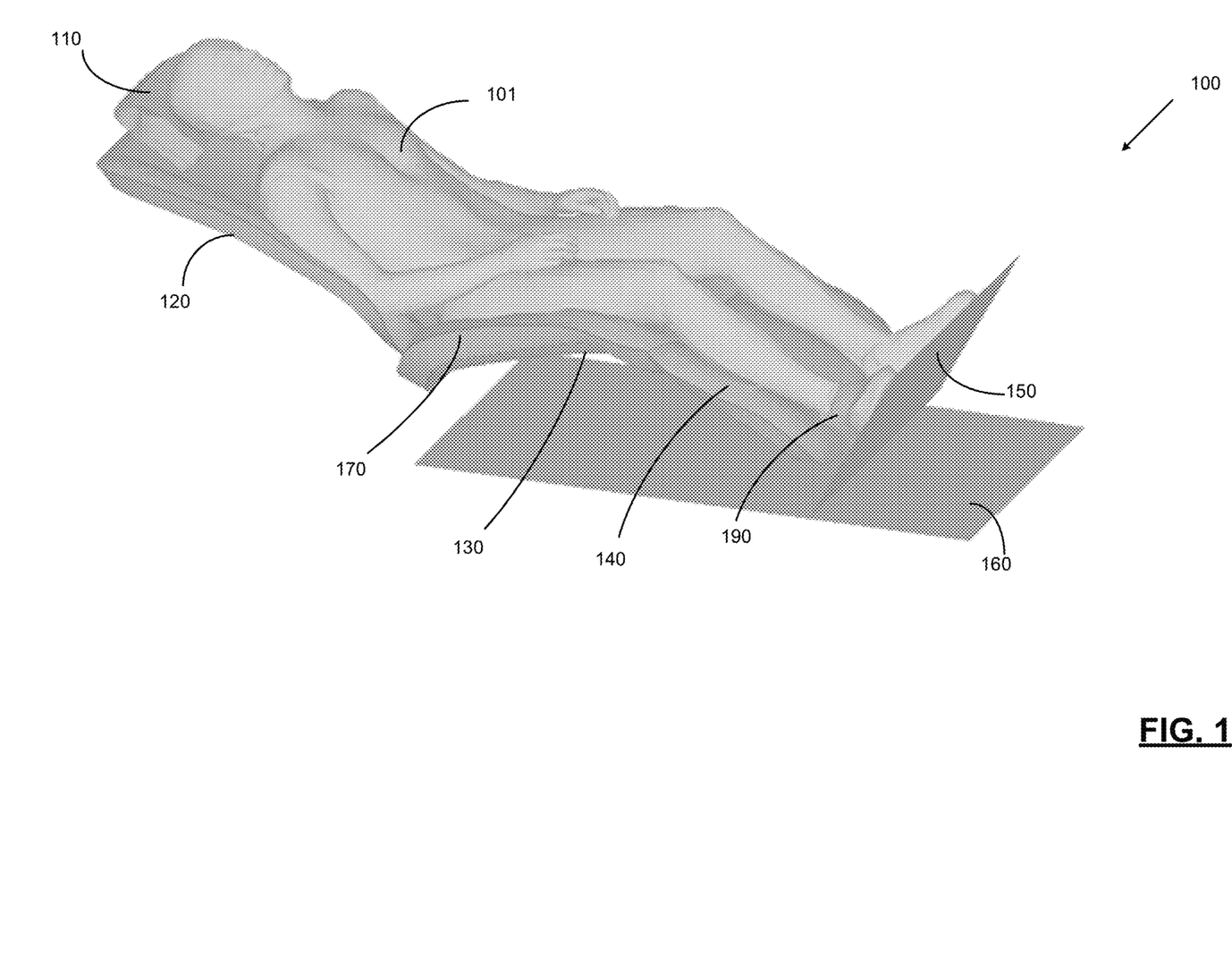
FIG. 1 is a perspective view of a vehicle seat adapted to incorporate a blanket airbag with integrated seat belt system according to an embodiment of the present disclosure.

FIG. 1 is a perspective view of a vehicle seat 100 adapted to incorporate a blanket airbag with integrated seat belt system according to an embodiment of the present disclosure. The vehicle seat 100 is shown in a reclining position in which the passenger 101 is nearly horizontal. The vehicle seat 100 comprises a headrest 110, a seat back 120, a seat bottom 130, a leg support 140, a footrest 150, and a base 160. The vehicle seat 100 further comprises a housing 170 and an ankle strap 190. The ankle strap 190 prevents the passenger 101 from sliding forward or backward in the vehicle seat 100 in the event of a collision from the front or the rear of the vehicle.

As will be explained below in greater detail, the blanket airbag is stored in an airbag enclosure that may be positioned on the lower surface of the seat back 120, near the position of the headrest 110. Alternatively, the airbag enclosure may be mounted on a structural component of the vehicle body that is proximate to the headrest 110. The housing 170 comprises electromechanical components that rapidly deploy the blanket airbag in the event of a collision. The electromechanical components in the housing 170 are similar to the automated components, such as pyrotechnic or motor driven pretensioners, of an automatic seatbelt restraint system that retract and tighten around a passenger in a car seat when a collision is detected.

The electromechanical components in the housing 170 are connected to the blanket airbag by a system of cables (or cords, straps, and the like). In an exemplary embodiment, the cables may run along the edge of the seat back 120 in an enclosed recess. When a collision occurs, the cables retract rapidly into the housing 170, thereby pulling the blanket airbag out of the airbag enclosure and covering the body of the passenger 101.

Figure 2:
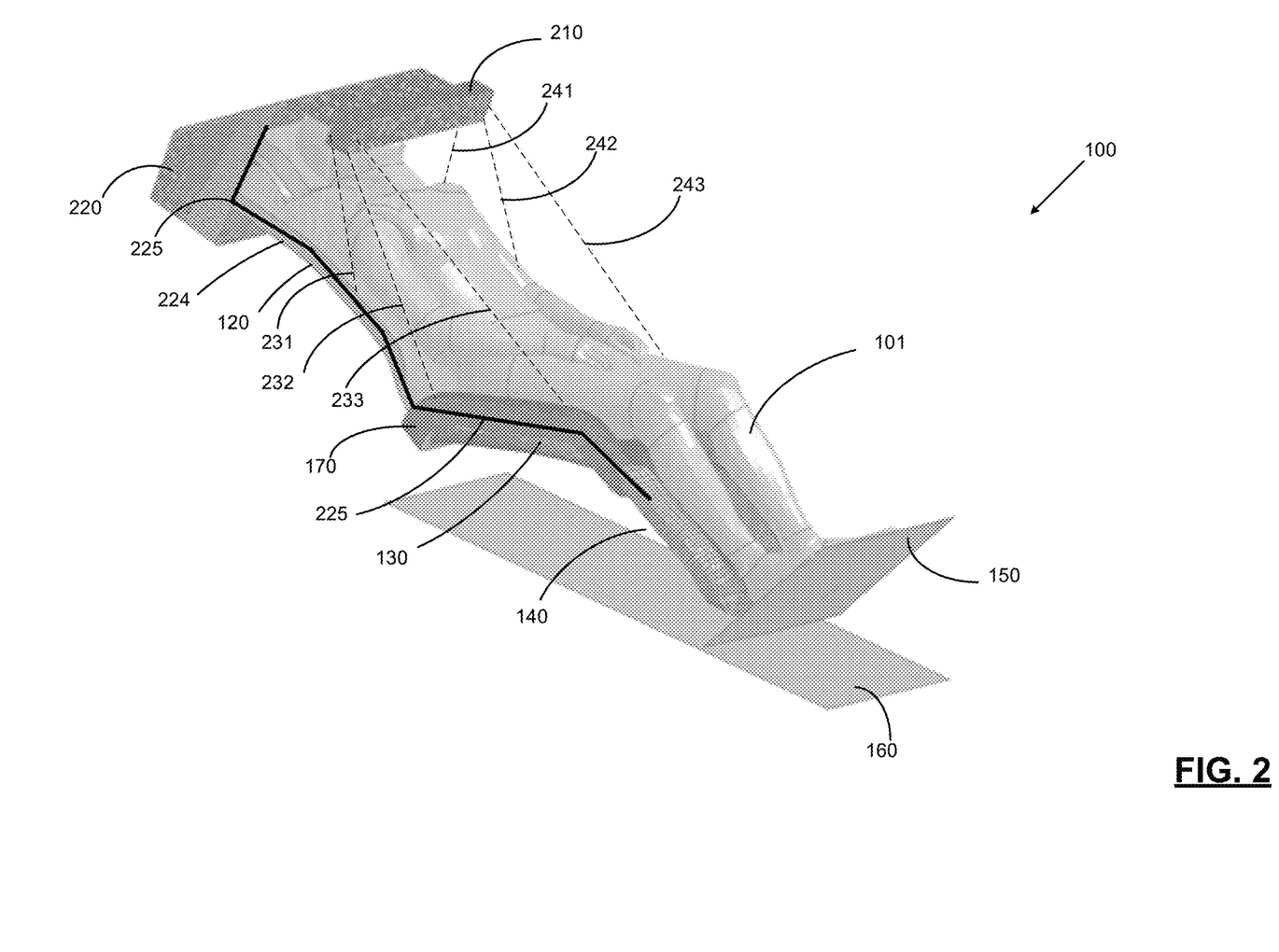
FIG. 2 is a perspective view of the vehicle seat in FIG. 1 with the blanket airbag partially deployed according to an embodiment of the present disclosure.

FIG. 2 is a perspective view of the vehicle seat 100 in FIG. 1 with the blanket airbag partially deployed according to an embodiment of the present disclosure. In FIG. 2, a blanket airbag enclosure 220 and a blanket airbag 210 are positioned near the headrest 110. Initially, the blanket airbag 210 may be disposed within the inside of the blanket airbag enclosure 220, which may be mounted on the bottom surface of seat back 120. When the blanket airbag 210 must be deployed, the blanket airbag enclosure 220 rapidly rotates out from underneath the seat back 120 and the blanket airbag 210 is quickly ejected out of the blanket airbag enclosure 220 and is positioned at the top of the seat back 120 above the head of the passenger 101. In an exemplary embodiment, the airbag blanket 210 and the blanket airbag enclosure 220 are both deployed by triggering a pyrotechnic process that releases high-pressure gas—in much the same manner as the steering wheel airbags found in cars. In an alternative embodiment, blanket airbag enclosure 220 is located adjacent to the head rest 110 in a fixed position and airbag blanket 210 achieves a position above the passenger's head during initial deployment and high-pressure gas insertion into the airbag blanket 210.

In FIG. 2, the blanket airbag 210 remains completely or mostly folded in FIG. 2 after being forced out of the blanket airbag enclosure 220 by high pressure gases within the cushion during initial deployment. The cables that couple the blanket airbag to the electromechanical systems in housing 170 are pulled from their undeployed location 222 along the housing 170, seat back outer edges 224, are tensioned and about to pull the blanket airbag 210 into place. Seam 225 (indicated by a heavy line) runs along the housing 170 and the seat back outer edges 224 and provides a path through which the cables 231-233 may be pulled. Seam 225 can be an interface between adjacent surfaces or a tear seam that rips open as the cables 231-233 move out from their undeployed location. The cables or belts 231-233 (shown as dotted lines) couple multiple attachment points on the blanket airbag 210 to multiple restraint points within the housing 170 on the right side of the vehicle seat 100. Similarly, the cables 241-243 (shown as dotted lines) couple multiple attachment points on the blanket airbag 210 to multiple restraint points within another housing 170 (not shown) on the left side of the vehicle seat 100 and can be pulled out of a seam similar to seam 225.

Figure 3:
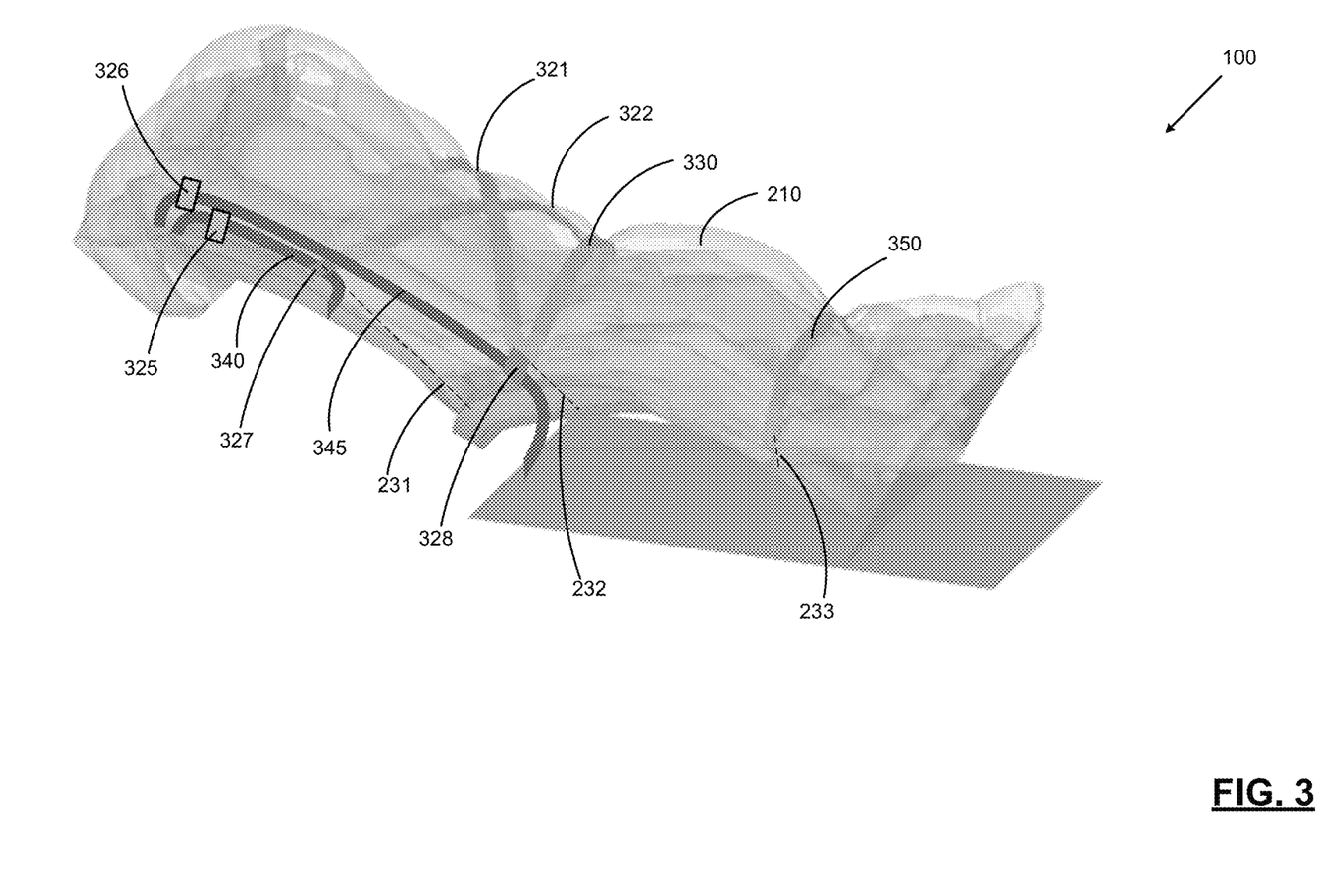
FIG. 3 is a partially transparent perspective view of the vehicle seat and the blanket airbag with integrated seat belt system after deployment in an accident according to an embodiment of the present disclosure.

FIG. 3 is a partially transparent perspective view of the vehicle seat 100 and the fully deployed blanket airbag 210 with integrated seat belt system after deployment in an accident according to an embodiment of the present disclosure. In the exemplary embodiment, the blanket airbag 210 further includes seatbelts 321, 322, 330 and 350 that are integrated into the blanket airbag 210 and are pulled into place by the cables 231-233 and 241-243 described above. The seatbelts 321 and 322 are crisscrossing shoulder belts that restrain the torso of the passenger 101. The seatbelt 330 is a lap belt positioned across the hips of the passenger 101. The seatbelt 350 is a leg belt that restrains the lower legs of the passenger 101 to prevent the passenger 101 from sliding off the vehicle seat 100 in a front collision or a rear collision. The seatbelt 350 may be coupled to a restraint system disposed in a separate housing (not shown) on the sides of the leg support 140 that is similar to the housing 170 associated with the seat bottom 130. The cable end points may be attached directly to the respective seatbelts or to the blanket airbag 210 in locations adjacent to the seatbelts. In FIG. 3, the multiple chambers of the blanket airbag 210 are completely inflated and the blanket airbag 210 is pulled into place over the passenger 101.

Optionally, the vehicle seat 100 may include guiderails 340 and 345 that assist in guiding the deployed blanket airbag 210 into place. The webbing of the seatbelts 321, 322 and 330 are routed around the rails 340 and 345, which are curved so the seatbelts terminate near a rail attachment in the deployed state. By way of example, the top of the shoulder belt 322 wraps around the rail 340 and is in location 325 prior to deployment and moves to location 327 upon deployment. The top of shoulder belt 321 would wrap around the corresponding rail on the opposite side of the seat in a similar fashion The bottom of the shoulder belt 321 and the lap belt 330 wrap around the rail 345 and is in location 326 prior to deployment and moves to location 328 upon deployment. The bottom of shoulder belt 322 and lap belt 330 would wrap around the corresponding rail on the opposite side of the seat in a similar fashion. The integrated seatbelts 321, 322, 330 and 350 are placed tactically to enable optimal protection by quickly pulling the blanket airbag 210 into position to enclose the passenger 101. The leg belt 350 and the footrest 150 combine to prevent occupant from sliding out of the vehicle seat 100. The rails 340 and 345 in FIG. 3 are outside of the seat for illustrative purposes. However, they may be smaller in height and may be located underneath the seat trim such as under seam 225.

Figure 4:
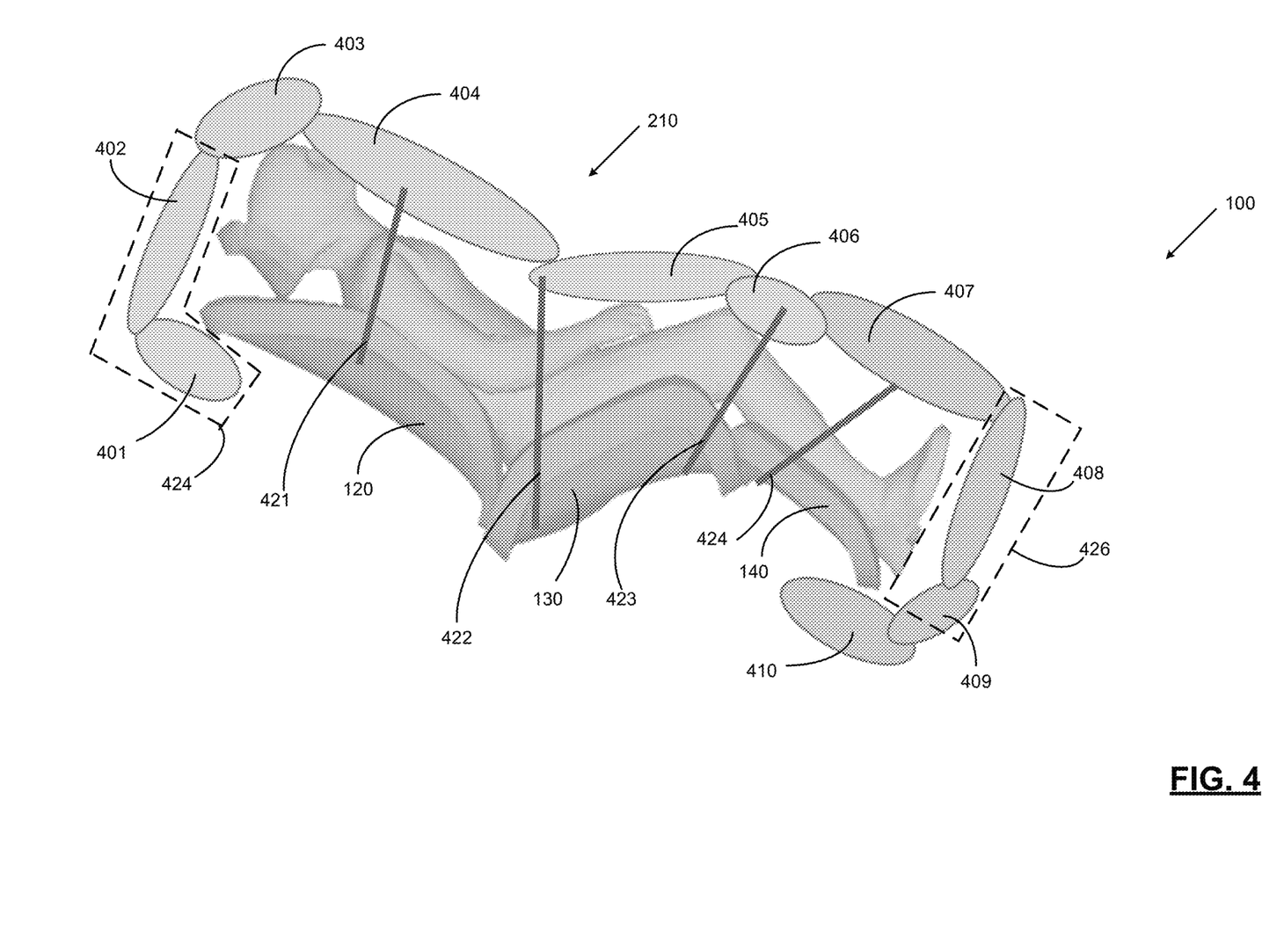
FIG. 4 is a partial cutaway side view of the vehicle seat and the blanket airbag with integrated seat belt system according to an embodiment of the present disclosure.

FIG. 4 is a partial cutaway side view of the vehicle seat 100 and the blanket airbag 210 according to an embodiment of the present disclosure. In one embodiment, the blanket airbag 210 comprises a plurality of chambers 401-410 that are coupled and internally interconnected by conduits that allow high-pressure gasses to fill the chambers 401-410 in sequence. By way of example, chamber 401 pressurizes first, and then gas flows through a conduit into chamber 402, which pressures second. Next, the gas flows through a second conduit into chamber 403, which pressures third. The process continues until finally chamber 410 is pressurized. The seatbelt tethers 421-424 hold the blanket airbag 110 in place.

In an alternative embodiment, the blanket airbag 210 may comprise two separate blanket airbags: i) an upper torso blanket airbag comprising chambers 401-405, and ii) a lower leg blanket airbag comprising chambers 406-410. In such an embodiment, the upper torso blanket airbag is deployed out of blanket airbag enclosure 220, as before. The lower leg blanket airbag is deployed from a second blanket airbag enclosure (not shown) positioned near the bottom of the footrest 150.

In yet another embodiment, the blanket airbag 210 could consist of chambers 403-407. The blanket airbag 210 would then be mounted to structure 424 adjacent the occupant's head and a foot support structure 426 could be present below the occupant's feet.

If two separate blanket airbags are used, then the airbags could be divided as follows: a) an upper torso blanket airbag comprising chambers 403-405 that is mounted to structure 424 and b) a lower leg blanket airbag comprising chambers 406 and 407 that is mounted to foot support structure 426.

Figure 5:
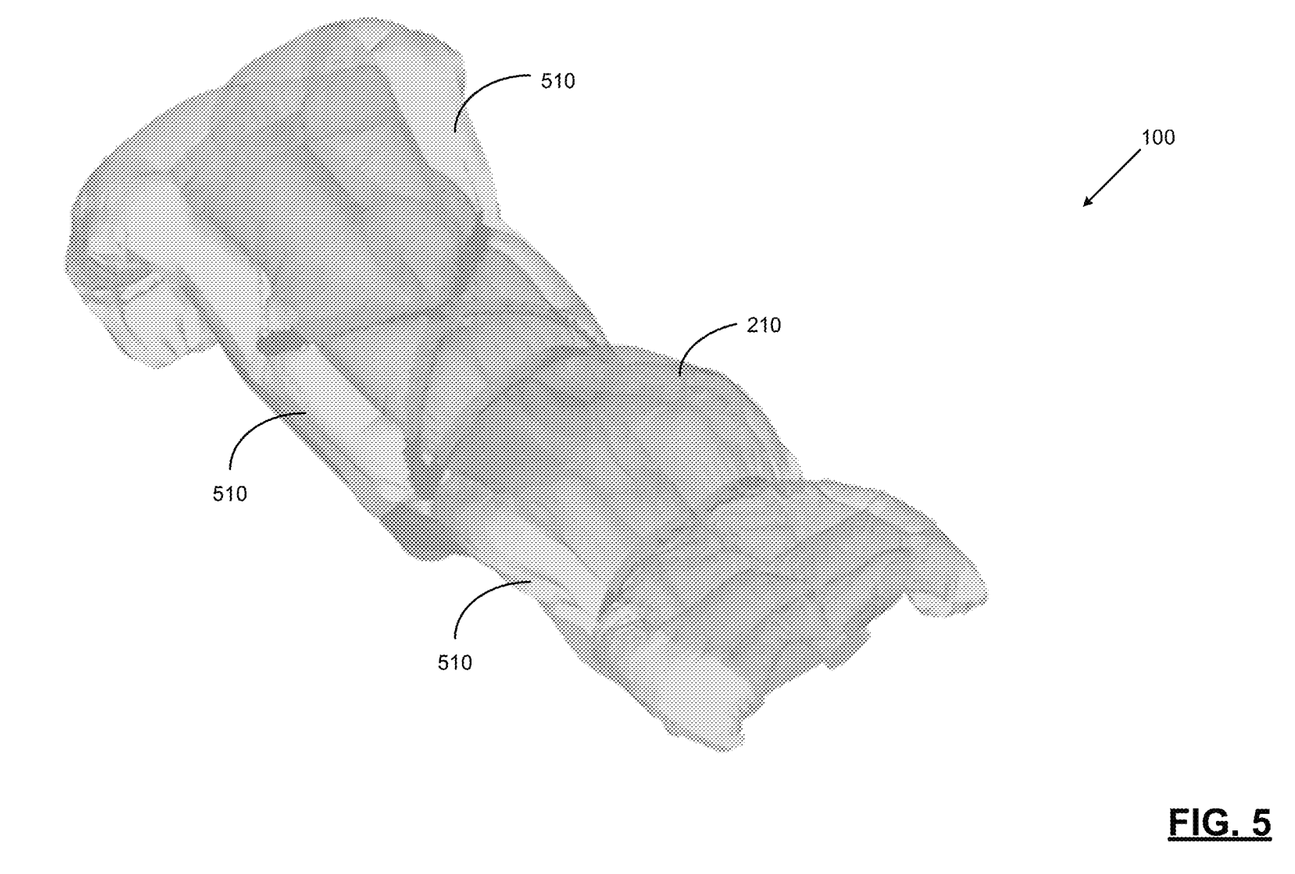
FIG. 5 is a perspective view of the vehicle seat and the blanket airbag with integrated seat belt system after deployment in an accident according to an embodiment of the present disclosure.

FIG. 5 is a perspective view of the vehicle seat 100 and the blanket airbag 210 with integrated seat belt system after deployment in an accident according to an embodiment of the present disclosure. The blanket airbag 210 further comprises at least one tube-shaped peripheral airbag 510 that is attached around the periphery of the blanket airbag 210. A plurality of conduits (not shown) connect the chambers 401-410 to the internal chambers of the at least one peripheral airbag 510. The peripheral airbag 510 provides additional protection for the passenger 101 from side impacts. The inflated tube chamber of the peripheral airbag 510 are located between the seatbelt straps and the passenger 101 so that inflation of the tube chambers helps tension the seatbelts 321, 322, 330, and 350 and removes any slack. The peripheral airbag may consist of a single continuous chamber or a series of chambers such as a left chamber, a right chamber, a chamber above/adjacent the head and a chamber below or adjacent to the feet. Depending on how the inflator ports gas into the blanket airbag 210, the peripheral airbag 510 may be filled first and then chambers 401-410 would be filled when gas moves from the peripheral airbag 509 into these chambers through the plurality of conduits. Alternatively, the chambers 401-410 could be filled first and then the peripheral airbag 510 could be filled from gas in chambers 401-410 that passes to peripheral airbag 510 through the plurality of conduits.

Figure 6:
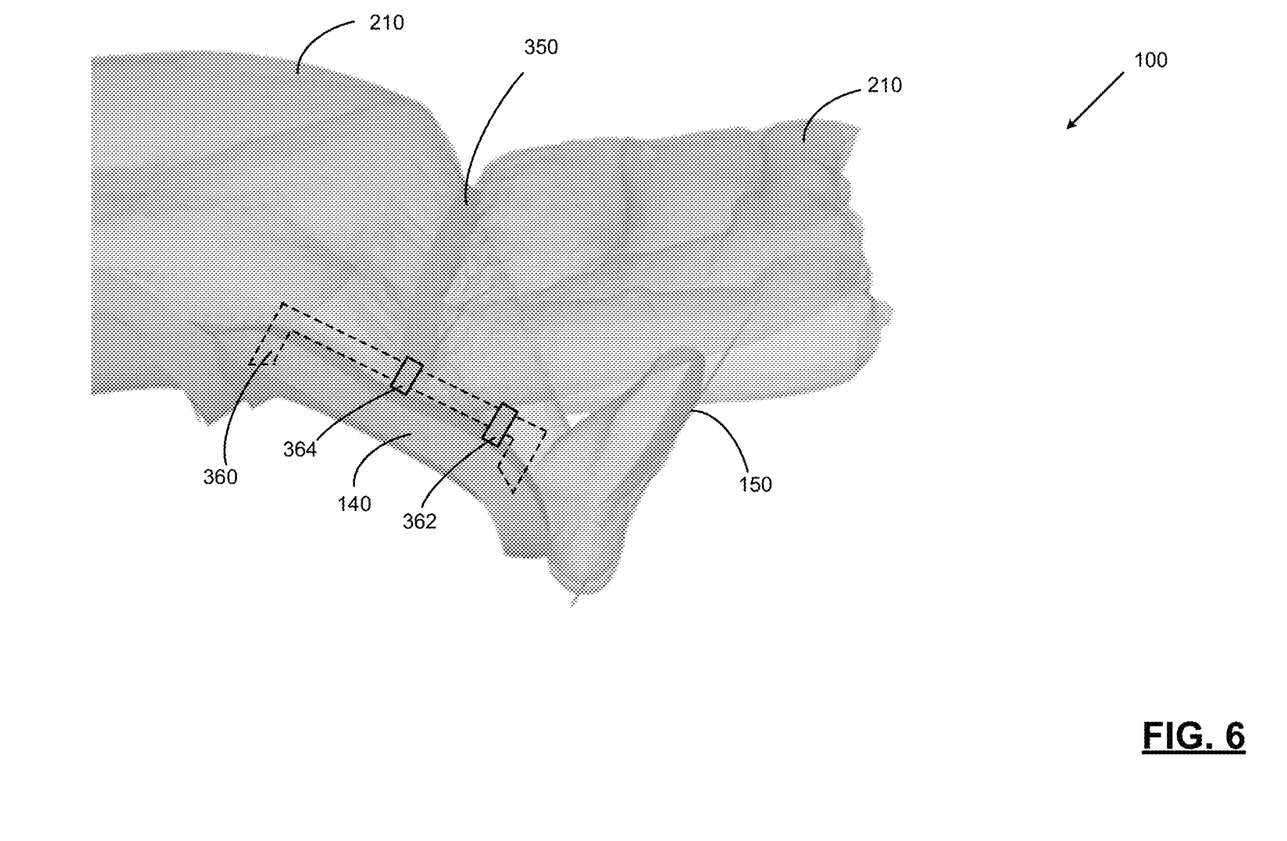
FIG. 6 is a side view of the lower portion of the vehicle seat and the blanket airbag with integrated seat belt system according to an embodiment of the present disclosure.

FIG. 6 is a side view of the lower portion of the vehicle seat 100 and the blanket airbag 210 according to an embodiment of the present disclosure. FIG. 6 depicts the legs and feet of the passenger 101 after deployment of the airbag 210 as the result of a collision of a severity which commands blanket airbag 210 deployment. The body of the passenger 101 has slid slightly downward towards the bottom of the vehicle seat 100. However, the passenger 101 is prevented from sliding further by the combined action of the leg belt 350 and the footrest 150. As an option, leg belt 350 may be attached to rail 360 (dotted line) and be located in location 362 prior to deployment and then in location 364 after deployment.

Figure 7:
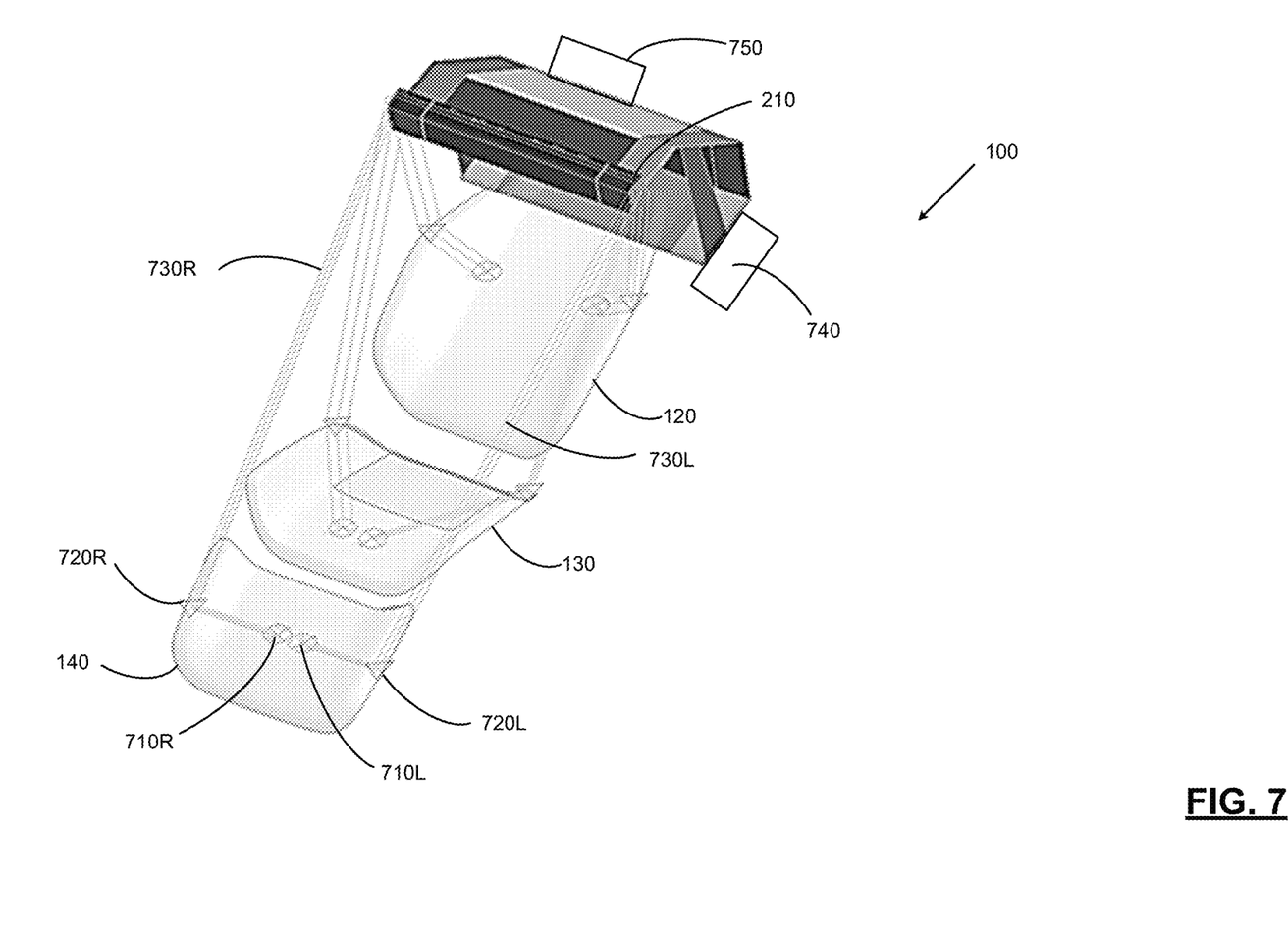
FIG. 7 is a perspective view of selected portions of the vehicle seat according to an embodiment of the present disclosure.

FIG. 7 is a perspective view of selected portions of the vehicle seat 100 according to an embodiment of the present disclosure. The seat cushions are removed for ease of explanation. The blanket airbag 210 has moved into position at the top of seat back 120 immediately after a collision and the blanket airbag 210 is being inflated in its initial stage. FIG. 7 illustrates one exemplary system for deploying the blanket airbag 210 into place. In lieu of embedding the electromechanical systems in the housing 140, the vehicle seat 100 in FIG. 7 places an electromechanical restraint system under each portion of the vehicle seat 100. By way of example, the electromechanical restraint system 710R is disposed under leg support 140 and is coupled to the right edge of the blanket airbag 210 using a belt 730R. The belt 730R is guided around the right edge of the leg support 140 using a buckle or loop 720R.

A second similar electromechanical restraint system 710L is disposed under leg support 140 and is coupled to the left edge of the blanket airbag 210 using a belt 730L. The belt 730L is guided around the left edge of the leg support 140 using a buckle or loop 720L. Similar mechanisms are implemented with the seat back 120 and the seat bottom 130. All of the electromechanical restraint system 710 associated with the seat back 120, the seat bottom 130, and the leg support 140 rapidly unfold the blanket airbag 210 and pull the blanket airbag 210 into place, as shown in FIG. 3, among others. During the deployment the inflator 750 will also be commanded to deploy and will provide gas to the blanket airbag 210 and the airbag will fill. Typical inflator 750 mounting practices could be used that can be found in other airbags. The inflator 750 may be located within blanket airbag 210 with a wiring harness from the inflator and inflator mounting studs running through holes or slots in the blanket airbag 210 fabric. The inflator 750 could also be partially within blanket airbag 210 and partially outside blanket airbag 210 with the inflator 750 nozzle portion that emits inflator gas within blanket airbag 210 and the inflator 750 end with the wiring harness and physical mounting features outside blanket airbag 210. In this configuration, the inflator 750 would protrude through a hole in the blanket airbag 210 or in an associated airbag housing (not shown) and would typically have a clamp between the blanket airbag fabric and the inflator to attach the blanket airbag 210 to the inflator 750.

In another alternative, the blanket airbag 210 could be stored in a position at the top of seat back 120, as shown in FIG. 7 and the initial deployment of the inflator and the electromechanical devices could eject the blanket airbag 210 from this location. In another alternative, an electromechanical device 740 could lift the blanket airbag 210 and thus eject it from an initial position adjacent the seat back prior to deployment to the position shown in FIG. 7 upon deployment.

The electromechanical devices can be motor driven or pyrotechnic device driven. Some seatbelt retractors use a motor to retract in the seatbelt. Likewise, some seatbelt systems use pyrotechnic pretensioners to retract in the seat belt. In addition, some roll bar actuators use a motor to lift the roll bar. Likewise some roll bar actuators and hood lifter actuators use pyrotechnic pretensioners to lift these devices. It is anticipated that the electromechanical device concepts herein would use similar actuation principles as these devices in a manner that would enable extended travel so that the blanket airbag and associated seat belts could achieve their deployed positions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle seat safety system comprising:
 a vehicle seat configured to move between a substantially reclining position and a substantially sitting position, the vehicle seat comprising at least a seat back and a seat bottom;
 an enclosure configured to store a blanket airbag in an undeployed position prior to a collision, wherein the enclosure is disposed near the head of a passenger in the vehicle seat;
 a first electromechanical restraint system associated with the seat back and coupled to the blanket airbag by a first physical coupling; and
 a second electromechanical restraint system associated with the seat bottom and coupled to the blanket airbag by a second physical coupling,
 wherein the first and second electromechanical restraint systems pull the blanket airbag from the undeployed position to a deployed position in which the blanket airbag substantially covers the portions of a passenger disposed on the seat back and the seat bottom.

2. The vehicle seat safety system of claim 1, wherein the first and second physical couplings comprise at least one of a belt, a cord, a cable, a cord, or a chain.

3. The vehicle seat safety system of claim 1, wherein the blanket airbag comprises a first plurality of inflatable chambers, wherein the first plurality of inflatable chambers are coupled to each other by a first plurality of conduits.

4. The vehicle seat safety system of claim 3, wherein the blanket airbag further comprises a tubular airbag disposed around the periphery of the blanket airbag, wherein the tubular airbag is coupled to the first plurality of inflatable chambers of the blanket airbag by a second plurality of conduits.

5. The vehicle seat safety system of claim 4, wherein the tubular airbag comprises a second plurality of inflatable chambers.

6. The vehicle seat safety system of claim 5, wherein the first and second plurality of inflatable chambers are coupled by the second plurality of conduits.

7. The vehicle seat safety system of claim 3, further comprising a source of high-pressure gas coupled to the blanket airbag.

8. The vehicle seat safety system of claim 7, wherein the source of high-pressure gas inflates the blanket airbag as the first and second electromechanical restraint systems pull the blanket airbag from an intermediate position to the deployed position.

9. The vehicle seat safety system of claim 8, wherein the blanket airbag further comprises a tubular airbag disposed around the periphery of the blanket airbag, wherein the tubular airbag is coupled to the first plurality of inflatable chambers and the source of high-pressure gas inflates the tubular airbag as the first and second electromechanical restraint systems pull the blanket airbag from the intermediate position to the deployed position.

10. The vehicle seat safety system of claim 9, wherein the source of high-pressure gas sequentially inflates the first plurality of inflatable chambers of the blanket airbag as the first and second electromechanical restraint systems pull the blanket airbag from the intermediate position to the deployed position.

11. The vehicle seat safety system of claim 1, wherein the first electromechanical restraint system is disposed in a housing on an edge of the seat back and the second electromechanical restraint system is disposed in a housing on an edge of the seat bottom.

12. The vehicle seat safety system of claim 1, wherein the first electromechanical restraint system is disposed on a bottom surface of the seat back and the second electromechanical restraint system is disposed on a bottom surface of the seat bottom.

13. The vehicle seat safety system of claim 1, wherein the vehicle seat further comprises a leg support.

14. The vehicle seat safety system of claim 13, wherein the vehicle seat safety system further comprises a third electromechanical restraint system associated with the leg support and coupled to the blanket airbag by a third physical coupling.

15. The vehicle seat safety system of claim 14, wherein the first, second, and third electromechanical restraint systems pull the blanket airbag from the undeployed position to a deployed position in which the blanket airbag substantially covers the portions of a passenger disposed on the seat back, the seat bottom, and the leg support.

16. The vehicle safety system of claim 1, further comprising an electromechanical system that ejects the blanket airbag from its initial position to an intermediate position in response to a deployment signal.

17. The vehicle safety system of claim 1, further comprising a rail on which a seatbelt is guided from an undeployed location to a deployed location.

18. The vehicle safety system of claim 17, further comprising a seam through which the seatbelt passes as the seatbelt moves from the undeployed location to the deployed location.

19. A method of operating vehicle seat safety system associated with a vehicle seat configured to move between a substantially reclining position and a substantially sitting position, the vehicle seat comprising at least a seat back and a seat bottom, the method comprising:
   storing in an enclosure a blanket airbag in an undeployed position prior to a collision, wherein the enclosure is disposed near the head of a passenger in the vehicle seat;
   in response to a collision, ejecting the blanket airbag from the enclosure to an intermediate position;
   pulling the blanket airbag from the intermediate position to a deployed position using a first electromechanical restraint system so that the blanket airbag substantially covers the portions of a passenger disposed on the seat back; and
   pulling the blanket airbag from the intermediate position to the deployed position using a second electromechanical restraint system so that the blanket airbag substantially covers the portions of a passenger disposed on the seat bottom.

20. The method of claim 19, wherein the first electromechanical restraint system is associated with the seat back and is coupled to the blanket airbag by a first physical coupling and wherein the second electromechanical restraint system is associated with the seat bottom and is coupled to the blanket airbag by a second physical coupling.

* * * * *